G. W. McKEE.
AUTOMATIC TEMPERATURE CONTROL FOR GAS FURNACES AND THE LIKE.
APPLICATION FILED DEC. 18, 1917.
1,312,639.
Patented Aug. 12, 1919
2 SHEETS—SHEET 1.
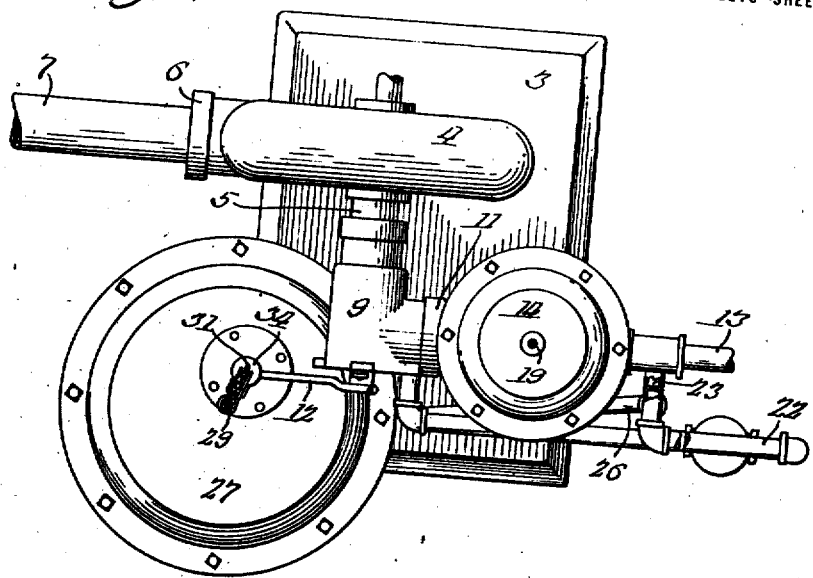
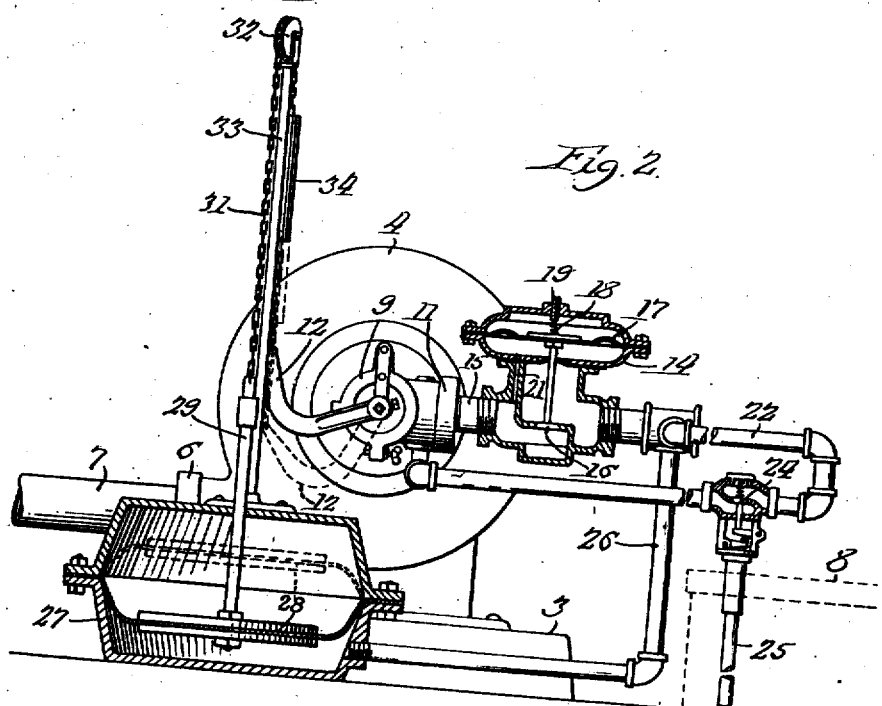
Inventor.
Garnet W. McKee
By Ira J. Wilson.
Atty.

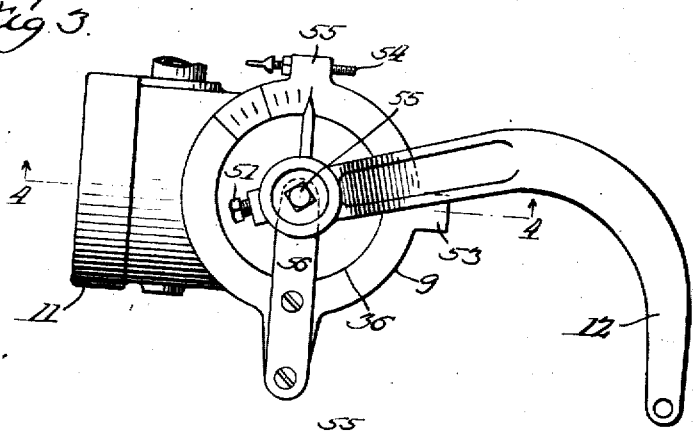
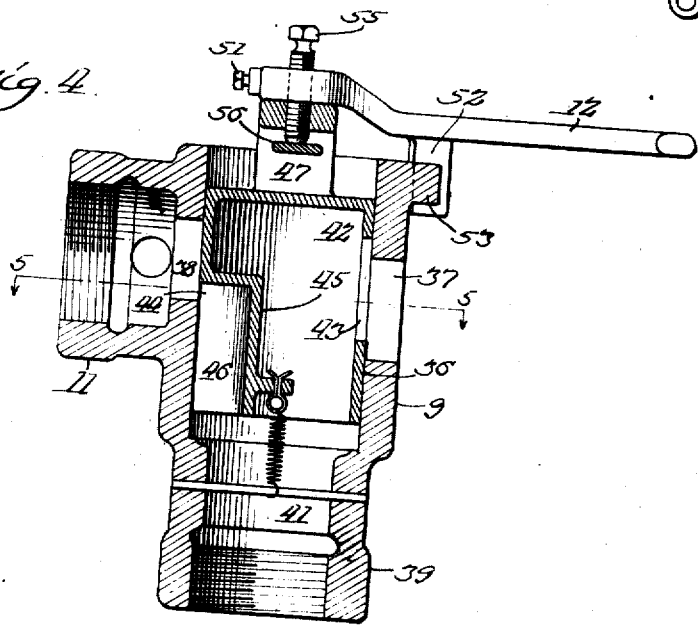
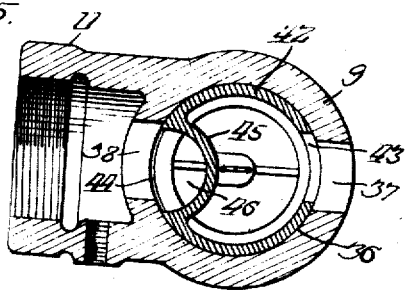

UNITED STATES PATENT OFFICE.

GARNET W. McKEE, OF ROCKFORD, ILLINOIS.

AUTOMATIC TEMPERATURE CONTROL FOR GAS-FURNACES AND THE LIKE.

1,312,639.      Specification of Letters Patent.      Patented Aug. 12, 1919.

Application filed December 18, 1917. Serial No. 207,706.

*To all whom it may concern:*

Be it known that I, GARNET W. McKEE, a subject of the King of Great Britain, residing at Rockford, in the county of Winnebago and State of Illinois, have invented certain new and useful Improvements in Automatic Temperature Controls for Gas-Furnaces and the like, of which the following is a specification.

This invention relates in general to apparatus for automatically regulating and controlling the temperature of gas burning furnaces, forges, boilers and the like, and has more specific reference to an apparatus for automatically increasing or diminishing the flow of combustive mixture so as to maintain at the point of combustion a predetermined and uniform temperature. One of the advantageous features of my invention resides in the provision of an apparatus which is simple in construction, cheap to manufacture and is extremely reliable and accurate in its operation.

These advantages are secured in my invention by utilizing the pressure of the gas from the city main as a motive power to actuate an apparatus which automatically increases or diminishes the flow of air and gas to the proportional mixer.

In order to facilitate an understanding of my invention, I have illustrated one preferred embodiment thereof on the accompanying drawings which should be considered in connection with the following description. On the drawings,—

Figure 1 is a plan view of an apparatus embodying my invention;

Fig. 2 is a side elevation thereof, certain parts being shown in section;

Fig. 3 is an enlarged end view of a mixing valve employed in the apparatus;

Fig. 4 is a longitudinal sectional view through the mixing valve taken substantially on the line 4—4 of Fig. 3; and Fig. 5 is a cross-sectional view through the mixing valve taken on the line 5—5 of Fig. 4.

By reference to the drawings it will be observed that the apparatus comprises, primarily, a base, 3, upon which is mounted a mixer 4 comprising in the present instance a centrifugal fan blower having a centrally disposed intake 5 and a tangentially disposed discharge 6 from which the mixture consisting of air and gas in the proper proportions is delivered through the pipe 7 to the burners which may be located in a gas furnace, a gas forge, a steam boiler, or any other gas heated apparatus. In the present instance I have shown in dotted lines in Fig. 2 a fragmentary portion of a gas furnace 8 to which the pipe 7 would lead so as to supply the combustive mixture from the mixer to the burners (not shown) of the furnace.

Air and gas are delivered in the proper proportions to the mixer 4 by means of a mixing valve 9 of any suitable or preferred construction. The particular mixing valve shown in the present instance simply for purpose of illustration, forms the subject matter of my co-pending application Serial No. 204,164, filed Nov. 27, 1917. This valve attached to the intake 5 of the mixer is provided with an air inlet port on one side and a gas inlet connection 11 on the opposite side, the valve proper disposed within the casing being constructed to open and close the air and gas inlet ports equally and simultaneously upon rotative movement of the valve within the casing by means of an arm 12 rigidly mounted co-axially with the valve. The relative proportions of air and gas may be varied as occasion requires, by adjusting the valve longitudinally in the casing, which adjustment, however, does not interfere with the rotative opening and closing movements of the valve.

The mixing valve is housed in a suitable casing shaped to provide a cylindrical valve chamber 36 provided with an air inlet port 37 and a gas inlet port 38 arranged in this instance at diametrically opposite sides of the chamber. The mixing valve is connected through means of the coupling stud 39 to the intake 5 of the mixer so that by means of suction therefrom air and gas will be drawn through the ports 37 and 38 into the valve chamber and thence to the mixer through the passage 41. The valve designated generally by reference character 42 fits within the cylindrical chamber 36 and is capable of being oscillated and moved longitudinally therein for purposes of adjustment. The valve consists of a hollow body provided at one side with a port 43 adapted to register with the port 37 and at its opposite side with a port 44 adapted to register with the port 38.

An arcuate wall 45 disposed around and extending downwardly from the port 44 deflects the inflowing gas and provides a passage 46 through which the gas is drawn into the passage 41 where it is mixed with the air flowing in through the ports 37 and 43. The top of the valve body 42 is provided with an upwardly projecting boss 47 to which the operating handle 12 is fixedly secured by a set screw 51. By means of this handle the valve body may be oscillated between fully open position, in which a lug 52 projecting downwardly from the handle 12 engages a fixed stop 53, on the casing and an adjustable abutment 54 consisting of a setscrew threaded through a boss 50 located 90 degrees from the boss 53 and locked in adjusted position by a lock nut. When the handle is in the position shown in Figs. 2 and 3 the ports 43 and 44 are in full registration with their respective ports 37 and 38. When the handle is swung until the boss 52 engages the adjustable stop 54 the ports 43 and 44 are both in only slight registration with their respective inlet ports, so that only a small quantity of air and gas will be admitted. This construction prohibits the entire closing off of the air and gas, thereby insuring a flow to the mixer 4 and the burners at a rate in excess of the rate of flame travel and consequently eliminating all danger of flareback from the burners.

Different grades of gas or different purposes for which the apparatus is to be employed may require a variation in the relative proportions of air and gas included in the mixture, and I have therefore made provision for regulating the relative proportions of air and gas delivered to the mixer, consisting of an adjustable set screw 55 threaded downwardly through the horizontally projecting portion of the boss 47 into engagement with a supporting bar 56 which is fixed to the top of the casing and projects directly beneath the screw 55. By adjusting this screw 55 in one direction the valve will be moved lengthwise to increase the effective area of the port 44 and diminish that of the port 43, and when adjusted in the opposite direction will effect an inverse action. Thus the relative proportions of air and gas admitted to the mixer may be regulated and controlled to a fine degree of nicety, and it should be noted that this regulation of the proportions affects in no way the opening or closing of the valve by means of the handle 12.

Gas is supplied to my apparatus from the city main through a lead pipe 13 which is connected with one side of a pressure-reducing regulator 14, the other side of the regulator being connected through a pipe 15 with a mixing valve 9. The pressure reducing device comprises a valve 16, the stem of which is attached to a diaphragm 17, the weight of the valve and stem being supported by a small contractile spring 18 attached at its upper end to a screw or plug 19 adjustably threaded through the top of the regulator casing. The valve 16 is normally closed, but when suction is created through the pipe 15 by the mixer 4 this suction will be transmitted through the lead passage 21 to the chamber beneath the diaphragm 17, thus lowering the diaphragm and opening the valve 16 so as to permit a flow of gas at substantially atmospheric pressure. This pressure reducing regulator delivers gas at uniform and substantially atmospheric pressure to the mixer irrespective of the pressure or variations in the pressure of the gas in the lead pipe 13. The mechanism thus far described constitutes the subject matter of other applications, and so far as the principle of my present invention is concerned these mechanisms may be of materially different construction than those herein shown for purposes merely of illustration.

My improvements, which will now be described, pertain to apparatus for automatically actuating the arm 12 so as to open or close the mixing valve 9 as more or less heat is required at the burners, thereby automatically regulating the amount of air and gas delivered to the mixer so as to maintain a uniform and requisite temperature in the apparatus heated by the combustive mixture delivered to the burners.

From the high pressure side of the pressure reducing regulator, I have run a by-pass pipe 22, which as shown, is connected at one end with the pipe 13 and at its other end is connected with the intake to the mixing valve at the low pressure side of the pressure reducing regulator. In the pipe 22 I have provided a restriction which gives an aperture 23 of predetermined size which will permit a relatively small flow of gas, for instance 10 feet per hour, from the high to the low side of the pressure reducing regulator. Normally this gas flows through the by-pass pipe 22 and is delivered into the mixing valve with the gas flowing through the reducer past the valve 16. The pipe 22 extends into proximity to the furnace, boiler or other apparatus 8, the temperature of which is to be controlled, and in this instance I have interposed a shut-off valve 24 which is automatically opened and closed as the temperature in the apparatus 8 falls below or rises above the temperature required. In the present instance, this valve 24 is controlled by the thermostatic element 25 projecting into the furnace, but it should be understood that a pressure controlled element might be substituted for the thermostatic element 25 without affecting the principle of my invention. In other words, if the apparatus 8 is a furnace or forge, a thermostatic element would be employed, while if the apparatus is used in conjunction with a boiler of either high or low pressure type the valve 24 would be opened and closed by a steam pressure actuated element of well known or preferred construction. In either event, the actuation and control of the mixing valve is secured by automatic opening or closing of the shut-off valve 24.

From the pipe 22 between the restriction 23 and the valve 24 I lead a pipe 26 which is connected at its other end with a diaphragm receptacle 27, the connection with the receptacle being established below the diaphragm 28. Fixedly secured to the center of the diaphragm and projecting upwardly above the receptacle 27 is a rod or plunger 29, which in turn is connected with the mixing valve arm 12 through the intermediary of a flexible connection 31, such as a chain which is trained over a pulley 32 at the top of the post 33 and is equipped with a counter-balance weight 34. Normally when the temperature or pressure in the apparatus 8 is below that required to shut off the valve 24, the diaphragm 28 will assume its lowered position shown in full lines in Fig. 2 and the arm 12 will be drawn upwardly into the full line position shown in this figure, so that the mixing valve is open to deliver a predetermined quantity of air and gas to the mixer. When the temperature or pressure in the apparatus 8 rises sufficiently to close the valve 24, the gas under pressure flowing past the restriction 23 will flow through the pipe 26 into the receptacle 27 where it will accumulate and act against the diaphragm 28 and elevate this diaphragm, thereby permitting the arm 12, which if preferred, may be weighted near its outer end, to swing downwardly under gravity to the dotted line position shown in Fig. 2, thereby reducing the amount of air and gas permitted to enter the mixer and consequently reducing the amount of combustive mixture delivered to the burners, so that the temperature of the apparatus 8 will be lowered. Upon lowering of the temperature, the valve 24 will again open so as to relieve the pressure in the pipe 22 and the pipe 26, whereupon the diaphragm 28 will lower under gravity forcing out the accumulated gas beneath it and swing the arm 12 upwardly again so as to open the mixing valve and admit a larger quantity of air and gas. It will thus be manifest that the pressure of the gas from the city main is utilized as a motive force to regulate the admission of air and gas through the mixing valve and that by means of this construction the temperature or pressure as the case may be, in the apparatus 8 to be controlled is automatically regulated to a fine degree of nicety.

It should be understood that the particular type of automatically actuated valve 24 employed is immaterial so far as the principle of my present invention is concerned as are also the particular construction of the mixer and the pressure reducing regulator. My invention, however, resides in the combination of various elements which enable me to utilize the gas under pressure for the purpose of automatically regulating the amount of combustive mixture delivered to the burners, and therefore I am enabled by this invention to automatically maintain any desired and a substantially uniform temperature or pressure in the apparatus 8 which is to be controlled.

I claim:

1. In an apparatus of the character described, the combination of an air and gas mixing device, a gas pressure reducer, a by-pass pipe leading from the high pressure to the low pressure side of said reducer, an automatically controlled valve in said pipe, and means controlled by the opening and closing movements of said valve for increasing or diminishing the flow of mixture to said mixing device.

2. In an apparatus of the character described, the combination of an air and gas mixing device, a gas pressure reducer, a by-pass pipe from the high to low side of said reducer, automatically controlled means for varying the pressure in said by-pass pipe, and means controlled by said pressure for increasing or diminishing the flow of mixture to said mixing device.

3. In an apparatus of the character described, the combination of an air and gas mixing valve, a gas pressure reducer, a by-pass pipe connected with the gas supply pipe and parallel with said reducer, an automatically controlled valve disposed in said by-pass pipe, a pressure actuated apparatus, a connection between said apparatus and said by-pass pipe, and a connection between said apparatus and said mixing valve whereby said mixing valve is opened or closed as the automatically controlled valve in the by-pass pipe is opened or closed respectively.

4. In an apparatus of the character described, the combination of a gas supply pipe, a pressure reducing regulator interposed therein, an air and gas mixing valve connected to said pipe, a by-pass pipe connected at one end to said gas supply pipe at the high pressure side of the pressure regulator and at its other end to the mixing valve and provided with a restriction, an automatically actuated valve disposed in said by-pass pipe, a pipe connected at one end intermediate said restriction and said valve, a pressure actuated device connected with the other end of said pipe, and operative connections between said pressure actuated device and said mixing valve.

5. In an apparatus of the character described, the combination of a mixing valve, a gas pressure reducer connected to the intake end of said valve, a by-pass around said reducer, pressure actuated means for opening or closing said mixing valve, and automatically operated means in said by-pass for regulating the pressure whereby said pressure actuating means is operated.

GARNET W. McKEE.